United States Patent
Banach et al.

(10) Patent No.: US 9,932,436 B2
(45) Date of Patent: Apr. 3, 2018

(54) MODIFIED ALKYLPHENOL-ALDEHYDE RESINS STABILIZED BY A SALICYLIC ACID

(71) Applicant: SI Group, Inc., Schenectady, NY (US)

(72) Inventors: Timothy Edward Banach, Scotia, NY (US); John Morgan Whitney, Niskayuna, NY (US); Milan Knezevic, Niskayuna, NY (US); Todd Scott Makenzie, Gansevoort, NY (US)

(73) Assignee: SI GROUP, INC., Schenectady, NY (US)

( * ) Notice: Subject to any disclaimer, the term of this patent is extended or adjusted under 35 U.S.C. 154(b) by 0 days.

(21) Appl. No.: 14/514,807

(22) Filed: Oct. 15, 2014

(65) Prior Publication Data
US 2015/0112024 A1   Apr. 23, 2015

Related U.S. Application Data (60) Provisional application No. 61/892,217, filed on Oct. 17, 2013.

(51) Int. Cl.
*C08G 8/32* (2006.01)
*C08L 7/00* (2006.01)
(Continued)

(52) U.S. Cl.
CPC .............. *C08G 8/32* (2013.01); *C08G 8/12* (2013.01); *C08G 8/24* (2013.01); *C08G 8/28* (2013.01);
(Continued)

(58) Field of Classification Search
CPC ... C08G 8/10; C08G 8/12; C08G 8/18; C08G 8/20; C08G 8/24; C08G 8/32
(Continued)

(56) References Cited

U.S. PATENT DOCUMENTS 1,987,228 A    1/1935  Bruson et al.
2,091,965 A  * 9/1937  Cherry ................ C08G 8/32
                                              525/508
(Continued)

FOREIGN PATENT DOCUMENTS

CN     101024679 A    8/2007
CN     101161616 A    4/2008
(Continued)

OTHER PUBLICATIONS

Gould, "Phenolic Resins" Reinhold Plastics Applications Series, pp. 26-29, 42-45 (1959).
(Continued)

*Primary Examiner* — Mike M Dollinger
(74) *Attorney, Agent, or Firm* — Jeffrey N. Townes; LeClairRyan (57) ABSTRACT

The invention relates to a process for improving the stability of a base-modified alkylphenol-aldehyde resin (such as an amine-modified alkylphenol-aldehyde resin). The process comprises the step of reacting a base-modified alkylphenol-aldehyde resin with a salicylic acid to stabilize the base-modified alkylphenol-aldehyde resin. The invention also relates to a modified alkylphenol-aldehyde resin formed from the stabilizing process, and its use in a tackifier composition and rubber composition.

11 Claims, 2 Drawing Sheets

(51) Int. Cl.
  *C08G 8/12* (2006.01)
  *C08L 21/00* (2006.01)
  *C08G 8/24* (2006.01)
  *C08G 8/28* (2006.01)
  C08L 61/14 (2006.01)
  C08L 61/06 (2006.01)

(52) U.S. Cl.
  CPC ............... *C08L 7/00* (2013.01); *C08L 21/00* (2013.01); *C08L 61/06* (2013.01); *C08L 61/14* (2013.01)

(58) Field of Classification Search
  USPC ........................................................ 525/138
  See application file for complete search history.

(56) References Cited

U.S. PATENT DOCUMENTS

| | | | |
|---|---|---|---|
| RE23,183 E | 12/1949 | Arvin et al. | |
| 2,610,955 A | 9/1952 | De Groote et al. | |
| 2,739,172 A | 3/1956 | Peters | |
| 3,438,931 A | 4/1969 | Mitchell et al. | |
| 3,624,038 A * | 11/1971 | Weidner | C08G 8/12 525/138 |
| 3,962,156 A | 6/1976 | Harrop | |
| 4,022,942 A | 5/1977 | Anderson et al. | |
| 4,092,367 A | 5/1978 | Bridwell et al. | |
| 4,113,700 A | 9/1978 | Culbertson | |
| 4,131,618 A | 12/1978 | Weinstock et al. | |
| 4,146,512 A * | 3/1979 | Weaver | C08G 14/06 523/200 |
| 4,166,191 A | 8/1979 | Ueoka et al. | |
| 4,239,869 A | 12/1980 | Annis | |
| 4,260,704 A | 4/1981 | Schmidt et al. | |
| 4,263,248 A | 4/1981 | Annis | |
| 4,461,916 A | 7/1984 | Alfs et al. | |
| 4,604,436 A * | 8/1986 | Thorpe | B41M 5/155 428/531 |
| 4,708,809 A | 11/1987 | Davis | |
| 4,870,215 A | 9/1989 | Wiker et al. | |
| 4,914,246 A | 4/1990 | Oswald et al. | |
| 4,954,663 A | 9/1990 | Marler et al. | |
| 4,973,764 A | 11/1990 | Oswald et al. | |
| 5,039,437 A | 8/1991 | Martella et al. | |
| 5,089,589 A | 2/1992 | Hesse et al. | |
| 5,100,989 A * | 3/1992 | Uhrig | A01N 25/30 527/602 |
| 5,262,508 A | 11/1993 | Martella et al. | |
| 5,399,786 A | 3/1995 | Queiroz et al. | |
| 5,734,078 A | 3/1998 | Feilden et al. | |
| 6,133,403 A * | 10/2000 | Gerber | C08L 61/06 524/128 |
| 6,433,242 B1 | 8/2002 | Wiese | |
| 6,608,162 B1 | 8/2003 | Chiu et al. | |
| 6,699,958 B1 * | 3/2004 | Detlefsen | C08G 8/32 524/594 |
| 7,425,602 B2 | 9/2008 | Howard et al. | |
| 7,579,075 B2 | 8/2009 | Furusawa et al. | |
| 8,030,418 B2 | 10/2011 | Banach et al. | |
| 8,470,930 B2 | 6/2013 | Howard et al. | |
| 8,557,930 B2 | 10/2013 | Banach et al. | |
| 9,670,303 B2 | 6/2017 | Yunfeng et al. | |
| 2002/0091224 A1 | 7/2002 | Saito et al. | |
| 2006/0020065 A1 | 1/2006 | Krull et al. | |
| 2006/0134446 A1 * | 6/2006 | Stumpf | B41M 5/3335 428/524 |
| 2006/0241276 A1 | 10/2006 | Inatomi et al. | |
| 2007/0060718 A1 | 3/2007 | Juhue et al. | |
| 2007/0172755 A1 | 7/2007 | Nakamura et al. | |
| 2007/0299163 A1 | 12/2007 | Hwang et al. | |
| 2008/0269351 A1 | 10/2008 | Campbell et al. | |
| 2009/0062472 A1 | 3/2009 | Howard et al. | |
| 2010/0029527 A1 | 2/2010 | Campbell et al. | |
| 2010/0192456 A1 | 8/2010 | Krull et al. | |
| 2012/0015300 A1 | 1/2012 | Endo et al. | |
| 2012/0142193 A1 | 6/2012 | Ogihara et al. | |
| 2013/0018163 A1 | 1/2013 | Suzuki et al. | |
| 2014/0023969 A1 | 1/2014 | Imada et al. | |
| 2014/0080965 A1 | 3/2014 | Yunfeng et al. | |
| 2015/0024173 A1 | 1/2015 | Tahara et al. | |
| 2015/0112023 A1 * | 4/2015 | Banach | C08G 8/12 525/132 |
| 2015/0112024 A1 * | 4/2015 | Banach | C08G 8/32 525/138 |

FOREIGN PATENT DOCUMENTS

| | | |
|---|---|---|
| CN | 101186679 A | 5/2008 |
| CN | 101190961 A | 6/2008 |
| CN | 101338013 A | 1/2009 |
| CN | 101511893 A | 8/2009 |
| CN | 1882625 B | 8/2011 |
| CN | 102432787 A | 5/2012 |
| CN | 102131858 B | 6/2013 |
| DE | 10010668 A1 | 10/2001 |
| EP | 1445268 A1 | 8/2004 |
| EP | 2192597 A1 | 6/2010 |
| GB | 842414 A | 7/1960 |
| GB | 906219 | 9/1962 |
| GB | 1083013 A | 9/1967 |
| GB | 1532115 A | 11/1978 |
| GB | 2024833 A | 1/1980 |
| JP | 2004-238618 A | 8/2004 |
| JP | 2010-248435 A | 11/2010 |
| KR | 10-2006-0043671 A | 5/2006 |
| WO | 86/04075 A1 | 7/1986 |
| WO | 92/07047 A1 | 4/1992 |
| WO | 2004/055106 A2 | 7/2004 |
| WO | 2008030418 A1 | 3/2008 |
| WO | WO 2008030418 A1 | 3/2008 |
| WO | 2009/155747 A1 | 12/2009 |
| WO | 2009155747 A1 | 12/2009 |
| WO | WO 2009155747 A1 | 12/2009 |
| WO | 2011/069052 A2 | 6/2011 |
| WO | 2011/118147 A1 | 9/2011 |
| WO | 2012/141165 A1 | 10/2012 |
| WO | 2014040300 A1 | 3/2014 |

OTHER PUBLICATIONS

Anastasiu et al., "New Aspects in the technology and control alkylphenol production", Revista de Chimie 15: 71-75 (1964).

Dmitriev et al., "Theoretical bases for alkylation of phenols on cation-exchange resins", Obogashchenie Uglia i Khimicheskaia Pererabotka Topliva 24: 147-165 (1968).

Saha et al., "Alkylation of Phenol with Olefins in the Presence of Sulphuric Acid", Bangladesh J. Sci. Ind. Res. 44: 131-136 (2009).

"Cresol mixture of isomers: technical crude, ~85% (sum of isomers, GC)" Sigma Aldrich Catalogue (2017).

* cited by examiner

MODIFIED ALKYLPHENOL-ALDEHYDE RESINS STABILIZED BY A SALICYLIC ACID

This application claims the benefit of priority of U.S. Provisional Patent Application Ser. No. 61/892,217, filed Oct. 17, 2013, which is hereby incorporated by reference in its entirety.

FIELD OF THE INVENTION

This invention generally relates to a process for stabilizing a base-modified alkylphenol-aldehyde resin, and tackifier compositions and rubber compositions containing the stabilized base-modified alkylphenol-aldehyde resin.

BACKGROUND

Rubber products are frequently made up of several rubber layers each with a same or a different chemical composition. During this "build up," the rubber layers must adhere to one another adequately in their pre-vulcanized state. For example, an assembled tire blank is required to hold together for a fairly long period prior to vulcanization. It is therefore important that the rubber mixtures used have an adequate "tack," the force required to pull apart two pre-vulcanized rubber mixtures which have been pressed together under certain defined conditions. While natural rubber mixtures generally have good tackiness, mixtures of synthetic rubbers are much less tacky and, in extreme cases, possess no tackiness at all. Therefore, it has been common practice to add a tackifier to less tacky rubbers or rubber mixtures to increase their tack. In synthetic rubber products, synthetic rubber adhesive compositions are employed to improve tack and provide good cured adhesion. Moreover, the rubber composition must not only have good initial tack, but also remain sufficiently tacky during the manufacturing process (i.e., good tack retention), even when the process is interrupted for fairly long periods, which is not unusual, particularly when manufacturing involves processes at different locations or requires storage and/or transport of pre-finished goods.

However, during the manufacturing and processing of the base-modified alkylphenol-aldehyde resins, the molecular weight of the resins can increase, causing instability of the resins, which limits the usefulness of the resin in many applications. Typically, the base-modified alkylphenol-aldehyde resins need to further react with an epoxide or other chemical reagents to stabilize the basic moiety or other reactive moieties in the resins.

Therefore, there remains a continual need to develop tackifiers based on base-modified alkylphenol-aldehyde resins which not only provide increased tack and tack retention, but, at the same time, also provide an increased stability. This invention answers that need.

SUMMARY OF THE INVENTION

One aspect of the invention relates to a process for stabilizing a base-modified alkylphenol-aldehyde resin. The process comprises the step of reacting a base-modified alkylphenol-aldehyde resin with a salicylic acid to stabilize the base-modified alkylphenol-aldehyde resin.

Another aspect of the invention relates to a process for stabilizing an amine-modified alkylphenol-aldehyde resin. The process comprises the step of reacting an amine-modified alkylphenol-aldehyde resin with a salicylic acid to produce a stabilized amine-modified alkylphenol-aldehyde resin. The amine-modified alkylphenol-aldehyde resin is a resin of formula (I):

In formula (I), $R^1$ is a linear, branched, or cyclic $C_1$-$C_{30}$ alkyl. $R^2$ is —$CHR^4R^5$. $R^3$ is H, $R^2$, —$CHR^4OH$, or a mixture of H, $R^2$, or —$CHR^4OH$. $R^4$ and $R^{4'}$ each are independently H or linear, branched or cyclic $C_1$-$C_8$ alkyl. $R^5$ is NR'R". R' and R" are independently H, $C_1$-$C_6$ alkyl, $C_2$-$C_6$ alkenyl, $C_2$-$C_6$ alkynyl, aryl, hydroxyl $C_1$-$C_6$ alkyl, carboxy $C_1$-$C_6$ alkyl, or R' and R" together form a 5- to 7-membered nitrogenous heterocyclic ring. The variable m plus the variable n is at least 1.

Another aspect of the invention relates to a modified alkylphenol-aldehyde resin with improved stability prepared by reacting a salicylic acid with a base-modified alkylphenol-aldehyde resin.

Another aspect of the invention relates to a modified alkylphenol-aldehyde resin with improved stability prepared by reacting a salicylic acid with an amine-modified alkylphenol-aldehyde resin. The amine-modified alkylphenol-aldehyde resin is a resin of formula (I):

In formula (I), $R^1$ is a linear, branched, or cyclic $C_1$-$C_{30}$ alkyl. $R^2$ is —$CHR^4R^5$. $R^3$ is H, $R^2$, —$CHR^4OH$, or a mixture of H, $R^2$, or —$CHR^4OH$. $R^4$ and $R^{4'}$ each are independently H or linear, branched or cyclic $C_1$-$C_8$ alkyl. $R^5$ is NR'R". R' and R" are independently H, $C_1$-$C_6$ alkyl, $C_2$-$C_6$ alkenyl, $C_2$-$C_6$ alkynyl, aryl, hydroxyl $C_1$-$C_6$ alkyl, carboxy $C_1$-$C_6$ alkyl, or R' and R" together form a 5- to 7-membered nitrogenous heterocyclic ring. The variable m plus the variable n is at least 1.

Another aspect of this invention relates to a tackifier composition comprising the modified alkylphenol-aldehyde resins with improved stability prepared by reacting a salicylic acid with the base-modified alkylphenol-aldehyde resin (e.g., the amine-modified alkylphenol-aldehyde resin).

Another aspect of this invention relates to a rubber composition comprising the modified alkylphenol-aldehyde resins with improved stability prepared by reacting a salicylic acid with the base-modified alkylphenol-aldehyde resin (e.g., the amine-modified alkylphenol-aldehyde resin).

Another aspect of the invention relates to a process for preparing an in-situ alkylphenol-aldehyde resin with improved stability. The process comprises the step of providing a raw alkylphenol composition. The raw alkylphenol composition comprises one or more alkylphenol compounds and at least about 1 wt % phenol. Each alkylphenol compound has one or more alkyl substituents. The raw alkylphenol composition is reacted directly, without pre-purification, with one or more aldehydes to form an in-situ alkylphenol-aldehyde resin. The in-situ alkylphenol-aldehyde resin is then modified with an amine. The amine-modified alkylphenol-aldehyde resin is reacted with a salicylic acid to stabilize the amine-modified alkylphenol-aldehyde resin.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

DETAILED DESCRIPTION OF THE INVENTION

This invention relates to a process for improving the stability of a base-modified alkylphenol-aldehyde resin, and tackifier compositions and rubber compositions containing the stabilized base-modified alkylphenol-aldehyde resin. The stabilizing process reacts the base-modified alkylphenol-aldehyde resin with a salicylic acid, which acts to stabilize the final resin by reacting with the basic moiety or other reactive moieties in the resin, and thus stabilizes the resin without using an epoxide or any other chemical reagents for stabilizing the basic moiety.

Stabilization of Base-Modified Alkylphenol-Aldehyde Resin with a Salicylic Acid

One aspect of the invention relates to a process for stabilizing a base-modified alkylphenol-aldehyde resin. The process comprises the step of reacting a base-modified alkylphenol-aldehyde resin with a salicylic acid to stabilize the base-modified alkylphenol-aldehyde resin.

Any alkylphenol-aldehyde resin known in the art may be used to form the base-modified alkylphenol-aldehyde resin. Exemplary alkylphenol-aldehyde resins include those products from the condensation reaction between an alkylphenol and one or more aldehydes.

Any alkylphenol compound known in the art suitable for the condensation reaction with one or more aldehydes may be used to prepare the alkylphenol-aldehyde resins. The alkylphenol compound may contain one or more alkyl groups in the ortho, meta, and/or para positions of the phenol. The alkyl group of the alkylphenol compounds may be a linear, branched, or cyclic alkyl containing 1 to 30 carbon atoms.

Any aldehyde known in the art for preparing an alkylphenol-aldehyde resin is suitable. Exemplary aldehydes include formaldehyde, methylformcel, butylformcel, acetaldehyde, propionaldehde, butyraldehyde, crotonaldehyde, valeraldehyde, caproaldehyde, heptaldehyde, benzaldehyde, as well as compounds that decompose to aldehyde such as paraformaldehyde, trioxane, furfural, hexamethylenetriamine, aldol, β-hydroxybutyraldelhyde, and acetals, and mixtures thereof. A typical aldehyde used is formaldehyde.

The reaction of alkylphenols with aldehydes to prepare alkylphenol-aldehyde resins is known in the art. The type of catalyst and the molar ratio of the reactants used in reaction determines the molecular structure and physical properties of the resin. A typical acid catalyst used is p-toluene sulfonic acid or dodecylbenzensulfonic acid. An aldehyde:phenol ratio between 0.5:1 and 1:0.1 (typically 0.5:1 to 0.8:1) with an acid catalyst typically generates novolak resins, which are thermoplastic in character. A higher aldehyde:phenol ratio (e.g., more than 1:1 to 3:1) with a basic catalyst typically give rise to resole resins, which are characterized by their ability to be thermally hardened at elevated temperatures.

The alkylphenol-aldehyde resin used is typically a resole type resin. Any suitable process for preparing resole type resins known in the art can be used. For instance, an alkylphenol can be reacted with one or more aldehydes in the presence of a base, as a basic catalyst, or for base-modification of the resulting resin. Suitable bases for preparing resole resins include ammonium hydroxide; tertiary amines such as triethylamine, triethanolamine, diethyl cyclohexyl amine, triisobutyl amine; and alkali and alkaline earth metal oxides and hydroxides. Alternatively, an alkylphenol can be reacted with one or more aldehydes in the presence of an acid catalyst to form a novolak resin first. Then, the novolak resin can be further reacted with one or more aldehydes under basic conditions to form a resole resin.

The resulting alkylphenol-aldehyde resin can be modified with one or more base. Suitable bases are typically primary or secondary amines having a formula of NHR'R", wherein R' and R" are independently H, $C_1$-$C_6$ alkyl, $C_2$-$C_6$ alkenyl, $C_2$-$C_6$ alkynyl, aryl, hydroxyl $C_1$-$C_6$ alkyl, carboxy $C_1$-$C_6$ alkyl, or R' and R" together form a 5- to 7-membered nitrogenous heterocyclic ring. Exemplary amines include mono and di-amino alkanes and their substituted analogs, e.g., ethylamine, dimethylamine, dimethylaminopropyl amine and diethanol amine; aryl amines and diamines, e.g., aniline, naphthylamine, benzyl amine, phenylene diamine, diamino naphthalenes; heterocyclic amines, e.g., morpholine, pyrrole, pyrrolidine, imidazole, imidazolidine, and piperidine; melamine and their substituted analogs. Other representative amines are alkylene polyamine, including ethylene polyamines which can be formed from reactants such as ethylenediamine, diethylene triamine, triethylene tetramine, tetraethylene pentamine, pentaethylene hexamine, hexaethylene heptamine, heptaethylene octamine, octaethylene nonamine, nonaethylene decamine, decaethylene undecamine and mixtures of such amines having nitrogen contents corresponding to the alkylene polyamines; and propylene polyamines which can be formed from reactants such as propylene diamine and di-, tri-, tetra-, penta-propylene tri-, tetra-, penta-, and hexa-amines. A further description of the process for preparing base-modified alklyphenol-aldehyde resins can be found in U.S. Pat. No. 8,030,418, which is hereby incorporated by reference in its entirety.

To allow adequate reaction of the alkylphenol composition with one or more aldehydes, xylene can be added in the reaction system, in a small amount, to keep the viscosity of the reaction mixture low and to keep the reaction product at a lower temperature until neutralization can be conducted. Other aliphatic (including cycloaliphatic) or aromatic, non-reactive organic solvent that has low-viscosity can also be used, such as toluene, benzene, naphthalene, nonane, octane, petroleum fractions, and the like.

The preparation of the alkylphenol-aldehyde resins can use commercially available high-purity alkylphenol (e.g., resin-grade), or, if the alkylphenol compound is prepared directly from the olefin and phenol, the alkylphenol can be distilled from the product mixture to obtain a purified alkylphenol before further usage. Typically, a high-purity alkylphenol composition (e.g., commercially available resin-grade) contains at least about 98 wt % or at least about 99 wt % the main alkylphenol component, and less than about 2 wt % or less than about 1 wt % phenol. For example, commercially available resin-grade PTBP contains at least 99.9 wt % PTBP and less than 0.1 wt % phenol; commercially available resin-grade PTOP contains at least 98 wt % PTOP and less than 2 wt % phenol.

Alternatively, suitable alkylphenol-aldehyde resin can be prepared from in-situ process. The embodiments of using in-situ process for preparing in-situ alkylphenol-aldehyde resin are described herein in the section of "In-Situ Preparation of modified Alkylphenol-Aldehyde Resin."

The base used to modify an alkylphenol-aldehyde resin is typically an amine, resulting an amine-modified alkylphenol-aldehyde resin.

Thus, in one aspect, the invention relates to a process for stabilizing an amine-modified alkylphenol-aldehyde resin. The process comprises the step of reacting an amine-modified alkylphenol-aldehyde resin with a salicylic acid to produce a stabilized amine-modified alkylphenol-aldehyde resin.

The amine-modified alkylphenol-aldehyde resin has formula (I):

(I)

In formula (I), the variable m plus the variable n is at least 1.

$R^1$ is a linear, branched, or cyclic $C_1$-$C_{30}$ alkyl. For instance, $R^1$ may be a linear or branched $C_1$-$C_{30}$ alkyl, a linear or branched $C_1$-$C_{15}$ alkyl, or a linear or branched $C_4$-$C_8$ alkyl. Typically $R^1$ is a tertiary butyl or tertiary octyl. $R^1$ may also be a $C_1$-$C_{30}$ cycloalkyl, for instance, a $C_5$-$C_{18}$ cycloalkyl, such as cyclohexyl, cyclopentyl, methyl cyclohexyl, or butyl-cyclohexyl.

$R^2$ is —$CHR^4R^5$. $R^3$ is H, $R^2$, —$CHR^4OH$, or a mixture of H, $R^2$, or —$CHR^4OH$.

$R^4$ and $R^{4'}$ each are independently H or linear, branched, or cyclic $C_1$-$C_8$ alkyl. For instance, $R^4$ and $R^{4'}$ each are independently H, or $R^4$ and $R^{4'}$ each are independently linear $C_1$-$C_4$ alkyl.

$R^5$ is NR'R". R' and R" are independently H, $C_1$-$C_6$ alkyl, $C_2$-$C_6$ alkenyl, $C_2$-$C_6$ alkynyl, aryl, hydroxyl $C_1$-$C_6$ alkyl, carboxy $C_1$-$C_6$ alkyl, or R' and R" together form a 5- to 7-membered nitrogenous heterocyclic ring. For instance, $R^5$ may be a radical of 1,8-p-menthane diamine, ethylene diamine, tri-ethylene tetramine, 1,3-bis(aminomethyl)-cyclohexane, m-xylylenediamine, monoethanolamine, diethanolamine, di-2-hydroxy propylamine, or morpholine. Typically, $R^5$ is a radical of diethanolamine, di-2-hydroxy propylamine, or morpholine.

The amine-modified alkylphenol-aldehyde resin can be further reacted with an epoxide before or after reacting the amine-modified alkylphenol-aldehyde resin with the salicylic acid. Typically, a base-modified alkylphenol-aldehyde resin needs to be reacted with an epoxide or other chemical reagents to stabilize the basic moiety or other reactive moieties in the modified resin. A detailed process for stabilizing a base-modified alkylphenol-aldehyde resin with an epoxide can be found in U.S. Pat. No. 8,030,418, which is hereby incorporated by reference in its entirety. The hydroxyl functionality remaining on the alkylphenol-aldehyde resin reacts with the epoxide too. Exemplary epoxide includes an epoxide of $C_4$-$C_{60}$ α-olefin, for instance, a straight chain $C_4$-$C_{22}$ epoxide, or a straight chain $C_6$-$C_{16}$ epoxide.

In this invention, however, the base-modified alkylphenol-aldehyde resin is reacted with a salicylic acid. Using a salicylic acid in the process can eliminate the need to use an epoxide or other chemical reagents for stabilizing the basic moiety, thus providing a cost-effective alternative for stabilizing the base-modified alkylphenol-aldehyde resin. The salicylic acid acts to stabilize the final resin by neutralizing any base such as amine (e.g., morpholine) released. This is done by forming a salt that plasticizes the resin, consequently diminishing the effects of molecular weight buildup by the decomposition of salicylic acid to phenol. Thus, the base-modified alkylphenol-aldehyde resin, after reacting with a salicylic acid, can be completely stabilized without using an epoxide or any other chemical reagents for stabilizing the basic moiety.

The salicylic acid can be added to reaction system before or after the base-modification reaction. The reactions may be carried out sequentially or simultaneously in a one-pot reaction vessel or as separate reactions isolating each or a desired intermediate product. The modification and stabilization process are carried out in a reactor, for example a customary vessel or glass flask which is equipped with a stirrer, heater, thermostat, feeding device, reflux condenser and water separator.

Suitable salicylic acids include salicylic acid, its structural derivatives, or mixtures thereof. A structural derivative of salicylic acid refers to a salicylic acid with one or more hydrogens on the phenol group of the salicylic acid being substituted with one or more substituents, The one or more substituents can be alkyl, alkoxy, phenyl or substituted phenyl, alkenyl, halo, or acetyl. A detailed list of structural derivatives of salicylic acid, and the process of making them may be found in U.S. Pat. Nos. 4,131,618 and 5,734,078, which are hereby incorporated by reference in their entirety. Typically, salicylic acid, alkyl salicylic acid (such as salicylic acid with one or more $C_1$-$C_4$ alkyl groups substituted on the phenol group of the salicylic acid; e.g., 3,5-di-tert-butylsalicylic acid), alkoxy salicylic acid (such as salicylic acid with one or more $C_1$-$C_4$ alkoxy groups substituted on the phenol group of the salicylic acid), acetylsalicylic acid, or combinations thereof, are used.

Modified Alkylphenol-Aldehyde Resin Stabilized by a Salicylic Acid, and its Use in Tackfier Composition/Rubber Composition Another aspect of the invention relates to a modified alkylphenol-aldehyde resin with improved stability prepared by reacting a salicylic acid with a base-modified alkylphenol-aldehyde resin.

Some embodiments of the invention provide a modified alkylphenol-aldehyde resin with improved stability prepared by reacting a salicylic acid with an amine-modified alkylphenol-aldehyde resin. The amine-modified alkylphenol-aldehyde resin is a resin of formula (I):

(I)

In formula (I), $R^1$ is a linear, branched, or cyclic $C_1$-$C_{30}$ alkyl. $R^2$ is —$CHR^4R^5$. $R^3$ is H, $R^2$, —$CHR^4OH$, or a mixture of H, $R^2$, or —$CHR^4OH$. $R^4$ and $R^{4'}$ each are independently H or linear, branched or cyclic $C_1$-$C_8$ alkyl. $R^5$ is NR'R". R' and R" are independently H, $C_1$-$C_6$ alkyl, $C_2$-$C_6$ alkenyl, $C_2$-$C_6$ alkynyl, aryl, hydroxyl $C_1$-$C_6$ alkyl, carboxy $C_1$-$C_6$ alkyl, or R' and R" together form a 5- to 7-membered nitrogenous heterocyclic ring. The variable m plus the variable n is at least 1.

The modified alkylphenol-aldehyde resins include resins resulted from all the above embodiments of the stabilizing process by reacting the base-modified alkylphenol-aldehyde resin (e.g., the amine-modified alkylphenol-aldehyde resin) with a salicylic acid to stabilize the base-modified alkylphenol-aldehyde resin.

The resulting base-modified alkylphenol-aldehyde resin stabilized by reacting with a salicylic acid can also be mixed with base-modified alkylphenol-aldehyde resins stabilized by an epoxide or other chemical stabilizing reagent for stabilizing the basic moiety or other reactive moieties in the resins.

Another aspect of this invention relates to a tackifier composition comprising the modified alkylphenol-aldehyde resins with improved stability prepared by reacting a salicylic acid with the base-modified alkylphenol-aldehyde resin (e.g., the amine-modified alkylphenol-aldehyde resin).

The modified alkylphenol-aldehyde resins used in the tackifier composition includes resins resulted from all the above embodiments of the stabilizing process by reacting the base-modified alkylphenol-aldehyde resin (e.g., the amine-modified alkylphenol-aldehyde resin) with a salicylic acid to stabilize the base-modified alkylphenol-aldehyde resin.

The tackifier composition may further comprise base-modified alkylphenol-aldehyde resins stabilized by an epoxide or other chemical stabilizing reagent for stabilizing the basic moiety or other reactive moieties in the resins.

Another aspect of this invention relates to a rubber composition comprising the modified alkylphenol-aldehyde resins with improved stability prepared by reacting a salicylic acid with the base-modified alkylphenol-aldehyde resin (e.g., the amine-modified alkylphenol-aldehyde resin).

The modified alkylphenol-aldehyde resins used in the rubber composition includes resins resulted from all the above embodiments of the stabilizing process by reacting the base-modified alkylphenol-aldehyde resin (e.g., the amine-modified alkylphenol-aldehyde resin) with a salicylic acid to stabilize the base-modified alkylphenol-aldehyde resin.

The rubber composition may further comprise base-modified alkylphenol-aldehyde resins stabilized by an epoxide or other chemical stabilizing reagent for stabilizing the basic moiety or other reactive moieties in the resins.

The rubber composition comprises, besides the modified alkylphenol-aldehyde resin, one or more rubber compounds. The rubber compound includes a natural rubber, a synthetic rubber, or a mixture thereof. For instance, the rubber composition is a natural rubber composition.

Alternatively, the rubber composition can be a synthetic rubber composition. Representative synthetic rubbers include diene-based synthetic rubbers, such as homopolymers of conjugated diene monomers, and copolymers and terpolymers of the conjugated diene monomers with monovinyl aromatic monomers and trienes. Exemplary diene-based compounds include, but are not limited to, polyisoprene such as 1,4-cis-polyisoprene and 3,4-polyisoprene; neoprene; polystyrene; polybutadiene; 1,2-vinyl-polybutadiene; butadiene-isoprene copolymer; butadiene-isoprene-styrene terpolymer; isoprene-styrene copolymer; styrene/isoprene/butadiene copolymers; styrene/isoprene copolymers; emulsion styrene-butadiene copolymer; solution styrene/butadiene copolymers; butyl rubber such as isobutylene rubber; ethylene/propylene copolymers such as ethylene propylene diene monomer (EPDM); and blends thereof. A rubber component, having a branched structure formed by use of a polyfunctional modifier such as tin tetrachloride, or a multifunctional monomer such as divinyl benzene, may also be used. Additional suitable rubber compounds include nitrile rubber, acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers such as chloroprene rubbers, chlorosulfonated polyethylene rubbers, hydrogenated nitrile rubber, hydrogenated isoprene-isobutylene rubbers, tetrafluoroethylene-propylene rubbers, and blends thereof.

The rubber composition can also be a blend of natural rubber with a synthetic rubber, a blend of different synthetic rubbers, or a blend of natural rubber with different synthetic rubbers. For instance, the rubber composition can be a natural rubber/polybutadiene rubber blend, a styrene butadiene rubber-based blend, such as a styrene butadiene rubber/natural rubber blend, or a styrene butadiene rubber/butadiene rubber blend. When using a blend of rubber compounds, the blend ratio between different natural or synthetic rubbers can be flexible, depending on the properties desired for the rubber blend composition.

The modified alkylphenol-aldehyde resin may be added to a rubber composition in the same amount, in the same manner and for the same uses as other known tackifers. In one embodiment, the modified alkylphenol-aldehyde resin is used in an amount ranging from about 0.1 per hundred rubber (phr) to 10 phr, for instance, from about 0.5 phr to 10 phr, from about 1 phr to about 7 phr, from about 2 phr to about 6 phr, or from about 1 phr to about 5 phr.

Also, the rubber composition may comprise additional materials, such as a methylene donor, one or more additives, one or more reinforcing materials, and one or more oils. As known to the skilled in the art, these additional materials are selected and commonly used in conventional amounts.

Suitable methylene donors include, for instance, hexamethylenetetramine (HMTA), di-, tri-, tetra-, penta-, or hexa-N-methylol-melamine or their partially or completely etherified or esterified derivatives, for example hexamethoxymethylmelamine (HMMM), oxazolidine or N-methyl-1,3,5-dioxazine, and mixtures thereof.

Suitable additives include, for instance, sulfur, carbon black, zinc oxides, silica, waxes, antioxidant, antiozonants, peptizing agents, fatty acids, stearates, accelerators, curing agents, activators, retarders, a cobalt, adhesion promoters, resins such as tackifying resins, plasticizers, pigments, additional fillers, and mixtures thereof.

Suitable reinforcing materials include, for instance, nylon, rayon, polyester, aramid, glass, steel (brass, zinc or bronze plated), or other organic and inorganic compositions. These reinforcing materials may be in the form of, for instance, filaments, fibers, cords or fabrics.

Suitable oils include, for instance, mineral oils and naturally derived oils. Examples of naturally derived oils include tall oil, linseed oil, and/or twig oil. Commercial examples of tall oil include, e.g., SYLFAT® FA-1 (Arizona Chemicals) and PAMAK 4® (Hercules Inc.). The one or more oils may be contained in the rubber composition, relative to the total weight of rubber compounds in the composition, less than about 5 wt %, for instance, less than about 2 wt %, less than about 1 wt %, less than about 0.6 wt %, less than about 0.4 wt %, less than about 0.3 wt %, or less than about 0.2 wt %. The presence of an oil in the rubber composition may aid in providing improved flexibility of the rubber composition after vulcanization.

The rubber compositions can be vulcanized by using mixing equipment and procedures conventionally employed in the art. Likewise, the final rubber products can be fabricated by using standard rubber curing techniques. The reinforced rubber compounds can be cured in a conventional manner with known vulcanizing agents at about 0.1 to 10 phr. A general disclosure of suitable vulcanizing agents may be found in Kirk-Othmer, Encyclopedia of Chemical Technology (3rd ed., Wiley, New York, 1982) vol. 20, pp. 365 to 468 (particularly "Vulcanization Agents and Auxiliary Materials," pp. 390 to 402), and Vulcanization by A. Y. Coran, Encyclopedia of Polymer Science and Engineering (2nd ed., John Wiley & Sons, Inc. 1989), both of which are incorporated herein by reference. Vulcanizing agents can be used alone or in combination.

The rubber compositions containing the modified alkylphenol-aldehyde resin exhibit significantly enhanced initial tack and tack retention, and thus can be useful to make a wide variety of products, for instance, tires or tire components such as sidewall, tread (or treadstock, subtread), carcass ply, body ply skim, wirecoat, beadfiller, or overlay compounds for tires. Suitable products also include hoses, power belts, conveyor belts, printing rolls, rubber shoe heels, rubber shoe soles, rubber wringers, automobile floor mats, mud flaps for trucks, ball mill liners, and weather strips.

In-Situ Preparation of Modified Alkylphenol-Aldehyde Resin

Another aspect of the invention relates to a process for preparing an in-situ alkylphenol-aldehyde resin with improved stability. The process comprises the step of providing a raw alkylphenol composition. The raw alkylphenol composition comprises one or more alkylphenol compounds and at least about 1 wt % phenol. Each alkylphenol compound has one or more alkyl substituents. The raw alkylphenol composition is reacted directly, without pre-purification, with one or more aldehydes to form an in-situ alkylphenol-aldehyde resin. The in-situ alkylphenol-aldehyde resin is then modified with an amine. The amine-modified alkylphenol-aldehyde resin is reacted with a salicylic acid to stabilize the amine-modified alkylphenol-aldehyde resin.

All the above embodiments of the stabilizing process by reacting the base-modified alkylphenol-aldehyde resin (e.g., the amine-modified alkylphenol-aldehyde resin) with a salicylic acid to stabilize the base-modified alkylphenol-aldehyde resin apply to the in-situ process.

Suitable alkylphenol compounds for preparing the in-situ modified alkylphenol-aldehyde resin may have one or more alkyl groups in the ortho, meta, and/or para positions of the phenol. The alkyl group of the alkylphenol compounds may be a linear, branched, or cyclic alkyl containing 1 to 30 carbon atoms. Typically, the alkyl group contains 4 to 18 carbon atoms. Typical alkylphenol composition includes at least one main alkylphenol component having at least one alkyl group at the para position of the phenol. Exemplary alkylphenols include para-methylphenol, para-tert-butylphenol (PTBP), para-sec-butylphenol, para-tert-hexylphenol, para-cyclohexylphenol, para-tert-octylphenol (PTOP), para-isooctylphenol, para-decylphenol, para-dodecylphenol, para-tetradecyl phenol, para-octadecylphenol, para-nonylphenol, para-pentadecylphenol, and para-cetylphenol.

The alkylphenol composition can be prepared in any suitable manner known in the art. One way to prepare the alkylphenol composition is through alkylation of phenol by directly reacting phenol with an alkylene. Various other methods of producing alkylphenol, including tert-butyl phenols are disclosed in U.S. Pat. No. 4,166,191 and WO 2011/069052, which are hereby incorporated by reference in their entirety. Alternatively, the alkylphenol composition may be prepared by transalkylation of a crude alkylphenol with phenol. Various transalkylation reactions are disclosed in U.S. Pat. No. 5,399,786, which is hereby incorporated by reference in its entirety. Using the transalkylation of crude alkylphenol, a crude or residual alkylphenol can be recycled or recovered easily and reused directly as a reaction material for the in-situ process. This is particularly advantageous in the in-situ process, as the process does not require a pre-purification step for the alkylphenol composition before it is reacted with an aldehyde. Thus, this in-situ process promotes a cost-effective way in re-using alkylphenol crude.

Regardless the method used to prepare the alkylphenol composition, the raw alkylphenol composition, without further purification, contains some amount of impurity (more than a trace amount). It includes unreacted phenol and one or more side-product alkylphenols where the number of the alkyl groups on phenol varies, and/or where alkyl groups are at different positions of phenol, and/or where alkyl groups are in different isomeric forms. For instance, raw PTBP prepared by reacting isobutylene and phenol is typically a mixture containing not only PTBP, but also di-tert-butylphenol (e.g., 2,4-di-tert-butylphenol or 2,6-di-tert-butylphenol) and unreacted phenol, and may additionally contain ortho-tertbutylphenol and tri-tert-butylphenol (e.g., 2,4,6-tri-tert-butylphenol). For instance, raw PTOP prepared by reacting octene (e.g., diisobutylene) and phenol is typically a mixture containing not only PTOP, but also di-tert-octylphenol (e.g., 2,4-di-tert-octylphenol or 2,6-di-tert-octylphenol) and unreacted phenol, and may additionally contain ortho-tert-octylphenol and tri-tert-octylphenol (e.g., 2,4,6-tri-tert-octylphenol).

Conventional technology for preparing alkylphenol-aldehyde resin typically uses commercially available high-purity alkylphenol (e.g., resin-grade), or, if the alkylphenol compound is prepared from scratch, it requires that the alkylphenol be distilled out from the product mixture to obtain a purified alkylphenol before further usage. Typically, a high-purity alkylphenol composition (e.g., commercially available resin-grade) contains at least about 98 wt % or at least about 99 wt % the main alkylphenol component, and less than about 2 wt % or less than about 1 wt % phenol. For example, commercially available resin-grade PTBP contains at least 99.9 wt % PTBP and less than 0.1 wt % phenol; commercially available resin-grade PTOP contains at least 98 wt % PTOP and less than 2 wt % phenol.

The embodiments of the invention, however, require the use of an in-situ alkylphenol composition (i.e., a raw alkylphenol composition prepared, without further processing to obtain a purified alkylphenol component) to react directly with one or more aldehydes to form an in-situ alkylphenol-aldehyde resin. This process is also referred to as an "in-situ" preparation of alkylphenol-aldehyde resin. The raw, unpurified alkylphenol composition is referred to as an "in-situ" alkylphenol composition. The alkylphenol-aldehyde resin prepared by such in-situ alkylphenol composition and in-situ process is referred to as an "in-situ" alkylphenol-aldehyde resin.

The in-situ process uses a raw alkylphenol composition, and eliminates, or substantially reduces, the pre-purification of alkylphenol before further usage. When the raw alkylphenol composition contains one main alkylphenol component, this main alkylphenol component may be as low as about 50 wt %. For instance, the main alkylphenol component may range from about 50 wt % to about 99 wt %, from about 50 wt % to about 95 wt %, from about 50 wt % to about 90 wt %, from 50 wt % to about 85 wt %, or from about 75 wt % to about 85 wt %. The raw alkylphenol composition may contain at least about 1 wt % phenol. For instance, phenol may range from about 1 wt % to about 10 wt %, about 2 wt % to about 10 wt %, about 3 wt % to about 10 wt %, about 4 wt % to about 10 wt %, about 5 wt % to about 10 wt %, or about 6 wt % to about 8 wt %. The other side product alkylphenols may range from 0 to about 50 wt %, from about 5 wt % to about 50 wt %, for instance from about 7 wt % to about 18 wt %.

In one embodiment, the main alkylphenol component contained in the in-situ alkylphenol composition is PTBP. The in-situ alkylphenol composition comprises PTBP, phenol, di-tert-butylphenol, and optionally tri-tert-butylphenol and ortho-tert-butylphenol. In this in-situ PTBP composition, PTBP may range from about 50 wt % to about 99 wt % or from about 50 wt % to about 85 wt %, phenol may range from about 1 wt % to about 10 wt % or from about 5 wt % to about 10 wt %, di-tert-butylphenol may range from 0 to about 14 wt % or from about 7 wt % to about 14 wt %, ortho-tert-butylphenol may range from 0 to about 3 wt %, and tri-tert-butylphenol may range from 0 to about 1 wt %.

In one embodiment, the main alkylphenol component contained in the in-situ alkylphenol composition is PTOP. The in-situ alkylphenol composition comprises PTOP, phenol, di-tert-octylphenol, and optionally ortho-tert-octylphenol and tri-tert-octylphenol. In this in-situ PTOP composition, PTOP may range from about 50 wt % to about 99 wt % or from about 50 wt % to about 85 wt %, phenol may range from about 1 wt % to about 10 wt % or from about 5 wt % to about 10 wt %, di-tert-octylphenol may range from 0 to about 14 wt % or from about 7 wt % to about 14 wt %, ortho-tert-octylphenol may range from 0 to about 3 wt %, and tri-tert-octylphenol may range from 0 to about 1 wt %.

The in-situ process can also use a mixture of two or more different in-situ alkylphenol compositions, e.g., mixture of one raw alkylphenol composition (e.g., its main alkylphenol component is alkylphenol-1) and another raw alkylphenol composition (e.g., its main alkylphenol component is alkylphenol-2, wherein alkylphenol-2 is different from alkylphenol-1). Exemplary in-situ alkylphenol composition for preparing an alkylphenol-aldehyde resin includes a mixture of an in-situ PTBP composition and an in-situ PTOP composition. The ratio of the different in-situ alkylphenol compositions in the mixture can vary. For example, the ratio of in-situ PTBP to in-situ PTOP in a mixture can range from about 90:10 to about 10:90, from about 75:25 to about 25:75, from about 60:40 to about 40:60, from about 60:40 to about 50:50. An exemplary ratio of in-situ PTBP to in-situ PTOP in a mixture is about 58:42. The weight percentage ranges of the two or more main alkylphenol components, phenol, and other side-product alkylphenols in the mixture of the in-situ alkylphenol compositions can be proportionated from the ratios of the different in-situ alkylphenol compositions in the mixture.

The mixture of different in-situ alkylphenol compositions can be prepared by preparing different in-situ alkylphenol compositions separately and then mix them together. Alternatively, the mixture of different in-situ alkylphenol compositions can be prepared in a one-pot process. In this one-pot process, a mixture of different in-situ alkylphenol compositions can be prepared by reacting phenol with a first alkyl compound to form the first in-situ alkylphenol, and subsequently adding a second alkyl compound to form the second in-situ alkylphenol; different alkyl compounds can be subsequently added into the existing mixture of in-situ alkylphenol composition in this one-pot process, if additional in-situ alkylphenols are desired in the mixture. The sequence of adding different alkyl compounds can change. For example, a mixture of in-situ PTBP and in-situ PTOP can be prepared by one-pot synthesis by reacting phenol with isobutylene first to produce in-situ PTBP, and then adding diisobutylene into the reaction mixture to additionally produce in-situ PTOP, or vise versa. The additions of alkyl compounds can also be simultaneous rather than sequential, i.e., when preparing the mixture of different in-situ alkylphenol compositions in the one-pot process, two or more different alkyl compounds or all different alkyl compounds can be added simultaneously.

The in-situ process can also use a mixture of an in-situ alkylphenol composition and a purified alkylphenol composition to prepare in-situ alkylphenol-aldehyde resins. The in-situ alkylphenol composition may contain a same or different main alkylphenol component than the purified alkylphenol composition. Exemplary in-situ alkylphenol composition for preparing an alkylphenol-aldehyde resin includes a mixture of an in-situ PTBP composition and a purified PTOP composition, or a mixture of an in-situ PTOP composition and a purified PTBP composition.

After the in-situ alkylphenol composition is obtained, it is then directly reacted, without purification, with one or more aldehydes to generate an in-situ alkylphenol-aldehyde resin.

Without being bound by theory, the in-situ alkylphenol composition containing a mixture of side-product alkylphenols that promote the incorporation of more aldehyde into the alkylphenol-aldehyde resin and can increase the molecular weight of the formed alkylphenol-aldehyde resin, resulting a higher melt point which typically contributes to a better tack performance when the resin is used in a tack composition. Increased tack performance herein can refer to initial tack, long term (aged) tack (or tack retention), or both. The improvement in aged tack (or tack retention) of a tackifier composition or rubber composition is particularly desirable, as it is often required that the tackifier composition remain sufficiently tacky over a fairly long period; it is not unusual that manufacture processes of goods containing the tackifier composition to be interrupted for fairly long periods when involving processes at different locations or involving storage and/or transportation of pre-finished goods. Moreover, the need for additional adhesive compositions to improve tack retention can be eliminated when using the in-situ alkylphenol-aldehyde resin, thereby reducing cost.

Figure 2:
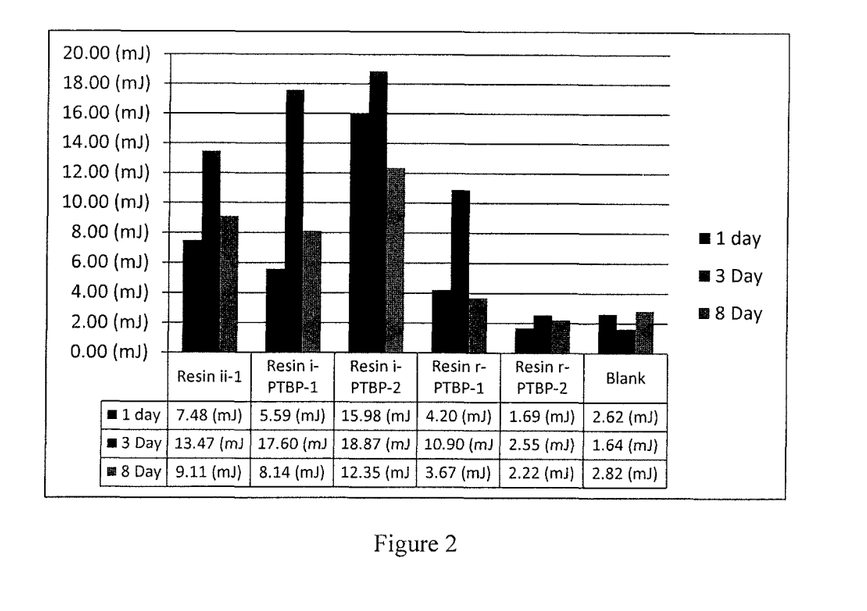
FIG. 2 shows the tack performance (tack and tack retention) of the rubber blends using the two in-situ PTBP resins having different melting points (Resin i-PTBP-1 and Resin i-PTBP-2), as compared to the tack performance of the rubber blends using corresponding resin-grade PTBP resin (Resin r-PTBP-1 and Resin r-PTBP-2), and the tack performance of the rubber blends using resins prepared from a mixture of in-situ PTOP and in-situ PTBP (Resin ii-1).

The tack of the formed in-situ alkylphenol-aldehyde resin, when used in a rubber composition, typically can increase about 10% or more, about 30% or more, about 50% or more, about 60% or more, about 200% or more, about 300% or more, about 500% or more, or about 800% or more, compared to an alkylphenol-aldehyde resin prepared from a purified alkylphenol. For instance, FIG. 2 shows that the tack of the formed in-situ alkylphenol-aldehyde resin in a rubber composition can increase about 30% or more (Resin i-PTBP-1 v. Resin r-PTBP-1 at Day 1), or about 800% or more (Resin i-PTBP-2 v. Resin r-PTBP-2 at Day 1).

The tack retention of the formed in-situ alkylphenol-aldehyde resin, when used in a rubber composition, typically can increase about 40% or more, about 60% or more, about 120% or more, about 200% or more, about 300% or more, about 500% or more, or about 600% or more, compared to an alkylphenol-aldehyde resin prepared from a purified alkylphenol. For instance, FIG. 2 shows that the tack retention (after 3 days or 8 days) of the formed in-situ alkylphenol-aldehyde resin in a rubber composition can increase about 60% or more (Resin i-PTBP-1 v. Resin r-PTBP-1 at Day 3), about 120% or more (Resin i-PTBP-2 v. Resin r-PTBP-2 at Day 8), about 400% or more (Resin i-PTBP-1 v. Resin r-PTBP-1 at Day 8), or about 600% or more (Resin i-PTBP-1 v. Resin r-PTBP-1 at Day 3).

The tack performance comparisons of the in-situ alkylphenol-aldehyde resins with regular alkylphenol-aldehyde resins are made keeping all other conditions or compositions the same, or substantially the same, except that the regular alkylphenol-aldehyde resin is prepared from a purified alkylphenol. The purified alkylphenol used in the comparisons typically refers to a high-purity alkylphenol composition (e.g., commercially available resin-grade) containing at least about 98 wt % or at least about 99 wt % the main alkylphenol component, and less than about 2 wt % or less than about 1 wt % phenol. For example, commercially available resin-grade PTBP contains at least 99.9 wt % PTBP and less than 0.1 wt % phenol; commercially available resin-grade PTOP contains at least 98 wt % PTOP and less than 2 wt % phenol.

Figure 1:
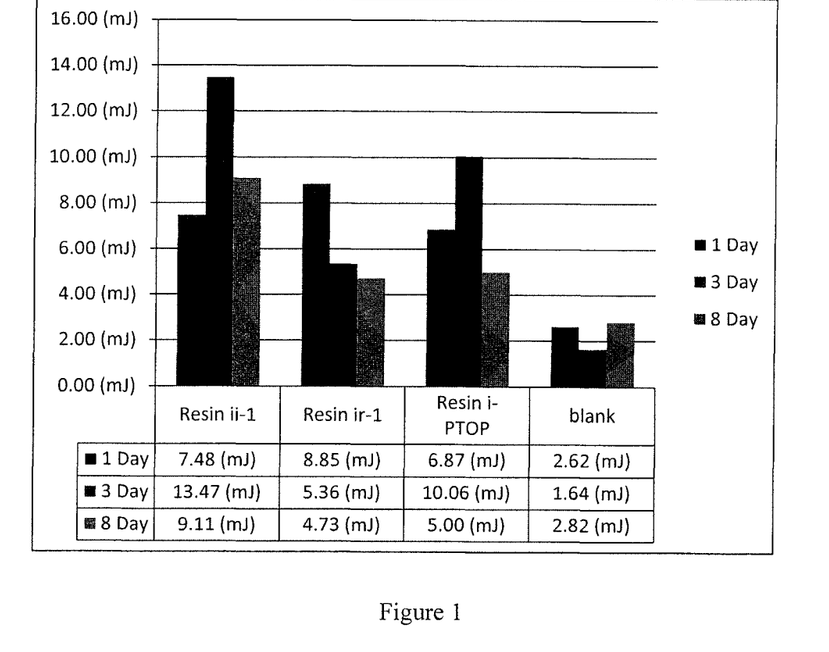
FIG. 1 shows the tack performance (tack and tack retention) of the rubber blends using the mixed in-situ resin prepared from a mixture of in-situ PTBP and in-situ PTOP (Resin ii-1), as compared to the tack performance of the rubber blends using in-situ PTOP resin (Resin i-PTOP), and the tack performance of the rubber blends using resins prepared from a mixture of in-situ PTOP and resin-grade PTBP (Resin ir-1).

The in-situ alklyphenol-aldehyde resins prepared from a mixture of different in-situ alkylphenol compositions have also shown better tack and tack retention, when used in a rubber composition, than a regular alklyphenol-aldehyde resin prepared from a mixture of purified alkylphenol compositions or a mixture of purified alkylphenol composition and in-situ alkylphenol composition. For instance, FIG. 1 shows that the tack retention of the formed mixture of in-situ alkylphenol-aldehyde resin, when used in a rubber composition, can increase about 90% or more (Resin ii-1 v. Resin ir-1 at Day 8), or about 150% or more (Resin ii-1 v. Resin ir-1 at Day 3) than an alklyphenol-aldehyde resin prepared from a mixture of purified alkylphenol composition and in-situ alkylphenol composition.

Any aldehyde known in the art for preparing an alkylphenol-aldehyde resin is suitable in the in-situ process. Exemplary aldehydes include formaldehyde, methylformcel, butylformcel, acetaldehyde, propionaldehde, butyraldehyde, crotonaldehyde, valeraldehyde, caproaldehyde, heptaldehyde, benzaldehyde, as well as compounds that decompose to aldehyde such as paraformaldehyde, trioxane, furfural, hexamethylenetriamine, aldol, β-hydroxybutyraldelhyde, and acetals, and mixtures thereof. A typical aldehyde used is formaldehyde.

The reaction of alkylphenols with aldehyde to prepare alkylphenol-aldehyde resins is known in the art. The type of catalyst and the molar ratio of the reactants used in reaction determine their molecular structure and therefore the physical properties of the resin. A typical acid catalyst used is p-toluene sulfonic acid or dodecylbenzensulfonic acid. An aldehyde:phenol ratio between 0.5:1 and 1:0.1 (typically 0.5:1 to 0.8:1) with an acid catalyst typically generates novolak resins, which are thermoplastic in character. A higher aldehyde:phenol ratios (e.g., more than 1:1 to 3:1) with a basic catalyst typically give rise to resole resins, which are characterized by their ability to be thermally hardened at elevated temperatures.

The in-situ process can be used to prepare resole resins, following any suitable process for preparing resole resins known in the art. For instance, an in-situ alkylphenol composition can be directly reacted, without pre-purification, with one or more aldehydes in the presence of a base, as a basic catalyst, or for base modification of the resulting resins. Suitable bases for preparing resole resins include ammonium hydroxide; tertiary amines such as triethylamine, triethanolamine, diethyl cyclohexyl amine, triisobutyl amine; and alkali and alkaline earth metal oxides and hydroxides. Alternatively, an in-situ alkylphenol composition can be directly reacted, without pre-purification, with one or more aldehydes in the presence of an acid catalyst to form a novolak resin first. Then, the novolak resin can be further reacted with one or more aldehydes under basic conditions to form a resole resin.

The resulting in-situ alkylphenol-aldehyde resins can be modified with one or more bases. Suitable bases are typically primary or secondary amines having a formula of NHR'R", wherein R' and R" are independently H, $C_1$-$C_6$ alkyl, $C_2$-$C_6$ alkenyl, $C_2$-$C_6$ alkynyl, aryl, hydroxyl $C_1$-$C_6$ alkyl, carboxy $C_1$-$C_6$ alkyl, or R' and R" together form a 5- to 7-membered nitrogenous heterocyclic ring. Exemplary amines include mono and di-amino alkanes and their substituted analogs, e.g., ethylamine, dimethylamine, dimethylaminopropyl amine and diethanol amine; aryl amines and diamines, e.g., aniline, naphthylamine, benzyl amine, phenylene diamine, diamino naphthalenes; heterocyclic amines, e.g., morpholine, pyrrole, pyrrolidine, imidazole, imidazolidine, and piperidine; melamine and their substituted analogs. Other representative amines are alkylene polyamine, including ethylene polyamines which can be formed from reactants such as ethylenediamine, diethylene triamine, triethylene tetramine, tetraethylene pentamine, pentaethylene hexamine, hexaethylene heptamine, heptaethylene octamine, octaethylene nonamine, nonaethylene decamine, decaethylene undecamine and mixtures of such amines having nitrogen contents corresponding to the alkylene polyamines; and propylene polyamines which can be formed from reactants such as propylene diamine and di-, tri-, tetra-, penta-propylene tri-, tetra-, penta-, and hexa-amines. A further description of the process for preparing base-modified alklyphenol-aldehyde resins can be found in U.S. Pat. No. 8,030,418, which is hereby incorporated by reference in its entirety. A typical base used is morpholine.

To allow adequate reaction of the in-situ alkylphenol composition with one or more aldehydes, xylene can be added in the reaction system, in a small amount, to keep the viscosity of the reaction mixture low and to keep the reaction product at a lower temperature until neutralization can be conducted. Other aliphatic (including cycloaliphatic) or aromatic, non-reactive organic solvent that has low-viscosity can also be used, such as toluene, benzene, naphthalene, nonane, octane, petroleum fractions, and the like.

After the in-situ alklyphenol-aldehyde resins are modified with one or more bases, the base-modified alkylphenol-aldehyde resin can be further reacted with an epoxide or other chemical reagents to stabilize the basic moiety or other reactive moieties in the modified resin. A detailed process for stabilizing a base-modified alkylphenol-aldehyde resin with an epoxide can be found in U.S. Pat. No. 8,030,418, which is hereby incorporated by reference in its entirety. The hydroxyl functionality remaining on the alkylphenol-aldehyde resin can also react with the epoxide too. Exemplary epoxide includes an epoxide of $C_4$-$C_{60}$ α-olefin, for instance, a straight chain $C_4$-$C_{22}$ epoxide, or a straight chain $C_6$-$C_{16}$ epoxide.

An exemplary embodiment includes reacting an amine-modified in-situ alkylphenol-aldehyde resin with an epoxide or a chemical reagent for stabilizing the amine moiety in the alkylphenol-aldehyde resin. A typical amine used is morpholine.

A further description of the in-situ process for preparing in-situ alkylphenol-aldehyde resin with improved tack performance may be found in U.S. Provisional Application, entitled "In-Situ Alkylphenol-Aldehyde Resins," filed on Aug. 29, 2013, which is hereby incorporated by reference in its entirety.

Embodiments of the invention also relate to the modified alkylphenol-aldehyde resins resulted from the above stabilizing process and/or in-situ process. Embodiments of the invention additionally relate to a tackifier composition and a rubber composition containing the modified alkylphenol-aldehyde resins resulted from the above stabilizing process and/or in-situ process, with enhanced stability and tack and tack retention.

EXAMPLES

The following examples are given as particular embodiments of the invention and to demonstrate the practice and advantages thereof. It is to be understood that the examples are given by way of illustration and are not intended to limit the specification or the claims that follow in any manner.

Example 1: Preparation of In-Situ Alkylphenol Resin from In-Situ Alkylphenol (In-Situ PTBP) (Resin i-PTBP)

The reaction system was set for atmospheric azeotropic distillation, the distillation receiver was filled to 90% capacity with water, and the resin kettle was pre-heated to 100° C. Molten in-situ butylphenol (19051 kg, 126.82 kilomols) was charged into the kettle. Xylene (1360 kg, 2.4% of the in-situ butylphenol load) was charged into the batch and agitated until a homogenous solution was obtained. Dodecylbenzene sulfonic acid (74 kg, 0.226 kilomoles) was then transferred into the kettle and mixed to the molten in-situ butylphenol solution. The batch temperature is then adjusted to 130° C.

Using a subsurface addition system, 50% aqueous formaldehyde (6130 kg, 102.07 kilomoles, F/P 0.805) is metered into the batch at a sufficiently slow rate to maintain the reaction temperate at 120-130° C. The xylene layer in the distillation receiver was returned to the batch while continuously removing the water of the reaction. After the addition was completed, the reflux was maintained by heating the batch until the formaldehyde level in the reflux return was less than 1 wt %. The resin was sampled for a ball and ring soften point of 130-135° C. Post-additions of formaldehyde could be performed to adjust the softening point higher. When the resin softening point was achieved, triethanolamine (44 kg, 0.29 kilomoles) was injected into the batch to neutralize the acid catalyst. Most of the xylene was then atmospherically distilled off until the reaction temperature reached 160° C. The remaining xylene was removed using vacuum distillation to a maximum of temperature of 180° C. and 0.1 atm. The kettle was repressurized with nitrogen and the resin was sampled to obtain a ball-and-ring softening point of 133° C. and free PTBP of less than 5 wt %. At this point, the molten resin was transferred to a cooling system for final packing as solid resin flakes or pastilles. This process produced Resin i-PTBP-2.

Lowering the melting point of the final product or adding less formaldehyde during the process can produce Resin i-PTBP-1 (same in-situ PTBP resin, but having a lower melting point than Resin i-PTBP-2).

In-situ alkylphenol-aldehyde resin (Resin i-PTBP-1 and Resin i-PTBP-2) prepared above were blended in a 60/40 natural rubber/polybutadiene (NR/PBD) rubber blend at 4 phr, and the resulted rubber blended were tested for tack performance. FIG. 2 shows the tack performance (tack and tack retention) of the rubber blends using the two in-situ PTBP resins having different melting points (Resin i-PTBP-1 and Resin i-PTBP-2), as compared to the tack performance of the rubber blends using corresponding resin-grade PTBP resin (Resin r-PTBP-1 and Resin r-PTBP-2), and the tack performance of the rubber blends using resins prepared from a mixture of in-situ PTOP and in-situ PTBP (Resin ii-1).

As shown in FIG. 2, the tack results from both the in-situ PTBP resins (Resin i-PTBP-1 and Resin i-PTBP-2) exceeded the tack results from the corresponding resin-grade PTBP resins (Resin r-PTBP-1 and Resin r-PTBP-2). Additionally, FIG. 2 shows that, overall, the tack result from the mixed in-situ PTBP/PTOP resins (Resin ii-1) exceeded the tack results from the in-situ PTBP resin with a lower melting point (Resin i-PTBP-1).

Example 2: Preparation of Amine-Modified Alkylphenol-Aldehyde Resin from In-Situ Alkylphenol (In-Situ PTBP) and Stabilized by Salicylic Acid (Resin-i-PTBP-Amine-SA)

The resin kettle was set for reflux return, and pre-heated to 100° C. Molten in-situ butyl phenol (14515 kg, 96.63 kilomols) was charged to a kettle. Dodecylbenzene sulfonic acid (27.2 kg, 0.08336 kilomoles) was then transferred into the kettle and mixed into the molten in-situ butyl phenol. Using a powder transfer system, salicylic acid (725.75 kg, 5.25 kilomoles) was added to the batch, agitated for sufficient time to make a homogeneous mixture. The batch temperature was then adjusted to 95° C. Using a subsurface addition system, 50% aqueous formaldehyde (4173 kg, 69.48 kilomoles) was metered into the batch at a sufficiently slow rate to maintain the batch temperature at 90-98° C. After the addition was completed, reflux was maintained by heating the batch to 102° C. until the formaldehyde level in the reflux return was less than 2 wt %. The batch was then adjusted to 93° C., and xylene (1360 kg, 9 wt % of the in-situ butyl phenol load) was charged into the batch, and agitated until a homogenous solution was obtained.

Morpholine (1161 kg, 13.33 kilomoles) was pumped into the batch and agitated until a homogenous solution was obtained. Using a subsurface addition system, 50% aqueous formaldehyde (1311 kg, 21.83 kilomoles) was metered into the batch at a slow enough rate so as to keep the batch temperate at 90-98° C. After the addition was completed, the reflux was maintained by heating the batch to 102° C. until the formaldehyde level in the reflux return was less than 0.2 wt %. Azeotropic distillation was performed to remove the water by heating the batch to 160° C. Once water was removed, vacuum distillation was performed by heating the batch to a maximum of 170° C. and 0.1 atm, and this condition was held with agitation for one hour. The kettle was then pressurized with nitrogen. Under distillation conditions, the molten resin was heated to 180° C., and agitated until a ball and ring softening point of at least 133° C. and a free para-tert-butylphenol of less than 5 wt % were obtained. At this point, the molten resin was transferred to a cooling system for final packing as solid resin flakes or pastilles (17424 kg, 98% yield).

Characterization of the product in this example: Softening point 133-143° C.; GPC: Mw 2186-3656, Mn 862-1020; DSC: Tg 83-87° C.; FTIR: 3247 cm$^{-1}$ (50% Y, broad), 2960 cm$^{-1}$ (20% T, sharp), 1755 cm$^{-1}$ (80% T, broad), 1605 cm$^{-1}$ (75% T, broad), 1484 cm$^{-1}$ (30% T, sharp), 1362 cm$^{-1}$ (45% T, sharp), 1205 cm$^{-1}$ (45% T, sharp), 1120 cm$^{-1}$ (67% T, sharp), 819 cm$^{-1}$ (65% T, sharp). Weight % free monomers in resin: 1.5-3% morpholine, 0.05-0.7% xylene, 3.5-5% PTBP, 0.47-1% DTBP, 0.07-0.38% phenol. Melt viscosity at 180° C. was 600-800 cPs. Acid number: 47-57.

Figure 3:
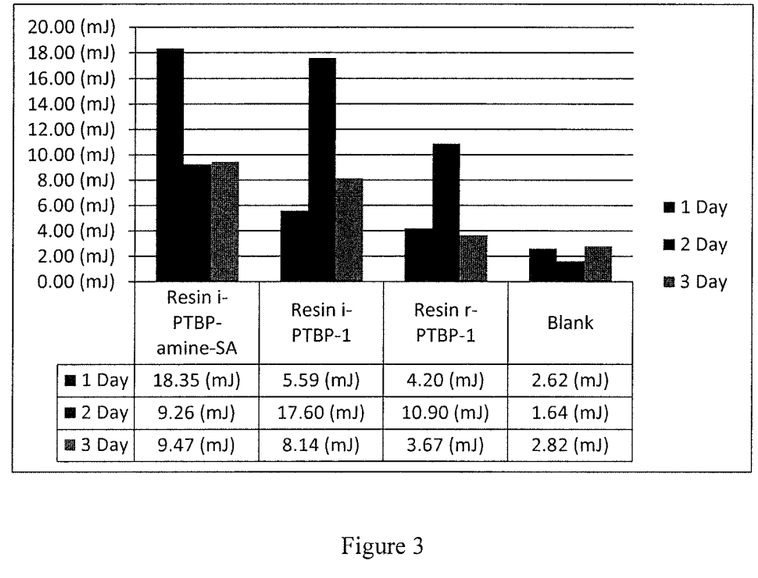
FIG. 3 shows the results of tack and tack retention of rubber blends using an in-situ resin prepared from in-situ PTBP with an amine modification and a salicylic-acid stabilization (Resin i-PTBP-amine-SA), as compared to the tack and tack retention of the rubber blends using in-situ PTBP resins with a lower melting point (Resin i-PTBP-1), and the tack and tack retention of the rubber blends using resin-grade PTBP resin with a lower melting point (Resin r-PTBP-1).

In-situ amine-modified alkylphenol-aldehyde resin stabilized by salicylic acid prepared above (Resin i-PTBP-amine-SA) was blended in a 60/40 natural rubber/polybutadiene (NR/PBD) rubber blend at 4 phr, and the resulted rubber blended were tested for tack performance. FIG. 3 shows the results of tack and tack retention of rubber blends using an in-situ resin prepared from in-situ PTBP with an amine modification and a salicylic-acid stabilization (Resin i-PTBP-amine-SA), as compared to the tack and tack retention of the rubber blends using in-situ PTBP resins with a lower melting point (Resin i-PTBP-1), and the tack and tack retention of the rubber blends using resin-grade PTBP resin with a lower melting point (Resin r-PTBP-1).

As shown in FIG. 3, the tack results from the amine-modified in-situ PTBP resins stabilized by salicylic acid (Resin i-PTBP-amine-SA) were better than the tack results from the in-situ PTBP resins with a lower melting point (Resin i-PTBP-1) and the resin-grade PTBP resin with a lower melting point (Resin r-PTBP-1).

Although preferred embodiments have been depicted and described in detail herein, it will be apparent to those skilled in the art that various modifications, additions, substitutions, and the like can be made without departing from the spirit of the invention and these are therefore considered to be within the scope of the invention as defined in the claims which follow.

We claim:

1. A modified alkylphenol-aldehyde resin with improved stability prepared by reacting a salicylic acid with an amine-modified alkylphenol-aldehyde resin of formula (I)

wherein the salicylic acid forms a salt that plasticizes the resin, and
wherein
  $R^1$ is a linear, branched, or cyclic $C_1$-$C_{30}$ alkyl;
  $R^2$ is —$CHR^4R^5$;
  $R^3$ is H, $R^2$, —$CHR^4OH$, or a mixture of H, $R^2$, or —$CHR^4OH$;
  $R^4$ and $R^{4'}$ each are independently H or linear, branched or cyclic $C_1$-$C_8$ alkyl;
  $R^5$ is NR'R", wherein R' and R" are independently H, $C_1$-$C_6$ alkyl, $C_2$-$C_6$ alkenyl, $C_2$-$C_6$ alkynyl, aryl, hydroxyl $C_1$-$C_6$ alkyl, carboxy $C_1$-$C_6$ alkyl, or R' and R" together form a 5-to 7-membered nitrogenous heterocyclic ring; and
  m plus n is at least 1.

2. The modified alkylphenol-aldehyde resin of claim 1, wherein $R^5$ is morpholinyl.

3. The modified, hydrocarbylphenol-aldehyde resin of claim 1, wherein $R^1$ is a straight or branched $C_1$-$C_{15}$ alkyl.

4. The modified, hydrocarbylphenol-aldehyde resin of claim 1, wherein $R^1$ is tertiary butyl or tertiary octyl.

5. A rubber composition comprising:
  the modified alkylphenol-aldehyde resin of claim 1, and
  a natural rubber, a synthetic rubber or a mixture thereof.

6. The rubber composition of claim 5, wherein $R^5$ is morpholinyl.

7. The rubber composition of claim 5, wherein $R^1$ is a straight or branched $C_1$-$C_{15}$ alkyl.

8. The rubber composition of claim 7, wherein $R^1$ is tertiary butyl or tertiary octyl.

9. The rubber composition of claim 5, wherein said rubber composition is a natural rubber composition, a natural rubber/polybutadiene rubber blend, a styrene butadiene rubber/butadiene rubber blend or a styrene butadiene rubber/natural rubber blend.

10. A tire comprising the rubber composition of claim 5.

11. The modified alkylphenol-aldehyde resin of claim 1, wherein the amine-modified alkylphenol-aldehyde resin is prepared from a high-purity alkylphenol.

* * * * *